(12) United States Patent
Matsumoto et al.

(10) Patent No.: US 9,114,470 B2
(45) Date of Patent: Aug. 25, 2015

(54) WORK TANK OF ELECTRIC DISCHARGE MACHINING DEVICE

(75) Inventors: Takemi Matsumoto, Tokyo (JP); Yoshinori Saigusa, Tokyo (JP); Hisashi Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 14/000,520

(22) PCT Filed: Feb. 21, 2011

(86) PCT No.: PCT/JP2011/053667
§ 371 (c)(1),
(2), (4) Date: Aug. 20, 2013

(87) PCT Pub. No.: WO2012/114424
PCT Pub. Date: Aug. 30, 2012

(65) Prior Publication Data
US 2013/0327744 A1    Dec. 12, 2013

(51) Int. Cl.
*B23H 1/10* (2006.01)
*B23H 7/36* (2006.01)

(52) U.S. Cl.
CPC ... *B23H 1/10* (2013.01); *B23H 7/36* (2013.01)

(58) Field of Classification Search
CPC ............ B23H 1/10; B23H 7/36; B65D 90/08; E05B 65/106; E05B 65/46
See application file for complete search history.

(56) References Cited

U.S. PATENT DOCUMENTS

| | | | |
|---|---|---|---|
| 5,270,512 A * | 12/1993 | Onandia | 219/69.11 |
| 5,455,400 A | 10/1995 | Bommeli et al. | |
| 6,392,182 B1 | 5/2002 | Hosaka | |
| 6,914,186 B2 * | 7/2005 | Koba et al. | 174/50 |
| 9,022,092 B2 * | 5/2015 | Yamasaki | 219/69.11 |
| 2004/0045732 A1 | 3/2004 | Koba et al. | |
| 2013/0298467 A1 * | 11/2013 | Yamasaki | 49/65 |

FOREIGN PATENT DOCUMENTS

| | | |
|---|---|---|
| JP | 05-237721 A | 9/1993 |
| JP | 08-071850 A | 3/1996 |
| JP | 08-155740 A | 6/1996 |
| JP | 3383245 B2 | 3/2003 |
| WO | 02/064298 A1 | 8/2002 |

OTHER PUBLICATIONS

International Search Report for PCT/JP2011/053667 dated Mar. 15, 2011.

* cited by examiner

*Primary Examiner* — Geoffrey S Evans
(74) *Attorney, Agent, or Firm* — Sughrue Mion, PLLC; Richard C. Turner (57) ABSTRACT

A work tank of an electric discharge machining device can manually move up and down, open and close, and lock and unlock a door without using any mechanical components. The work tank includes: a box-shaped tank body having an open front surface and an openable and closable door; a pair of handle bars that are placed right and left of the tank body; a handle that is installed between front end parts of the pair of handle bars; a pair of door stays that are placed at right and left of the tank body; a guide rail that moves up and down the door stay hung from the handle bar; a load receiving unit that supports a load of the door stay; and a stopper that restricts downward rotation and a frontward movement of the handle bar at a predetermined rotation position.

6 Claims, 14 Drawing Sheets

WORK TANK OF ELECTRIC DISCHARGE MACHINING DEVICE

CROSS REFERENCE TO RELATED APPLICATIONS

This application is a National Stage of International Application No. PCT/JP2011/053667 filed Feb. 21, 2011, the contents of all of which are incorporated herein by reference in their entirety.

FIELD

The present invention relates to a structure of a door of a work tank of a wire electric discharge machining device.

BACKGROUND

An electric discharge machining device includes a work tank in which a machining fluid is stored and machining is performed. The work tank includes an openable and closable door at the front thereof so that a workpiece can be easily set during setup before and after machining.

When the door is manually opened and closed, it is required that the door can be easily and reliably opened and closed and locked and unlocked in view of workability.

Patent Literature 1 discloses a structure of a work tank door of which opening and closing and locking and unlocking are manually performed. According to the structure of the work tank door disclosed in Patent Literature 1, moving up and down and locking and unlocking of the door at the time of opening and closing the door can be manually and reliably performed.

CITATION LIST

Patent Literature

Patent Literature 1: Japanese Patent No. 3383245

SUMMARY

Technical Problem

However, according to the conventional technique mentioned above, because a handle for moving up and down the door, which also serves as a lock mechanism, is supported by the door, the handle is also moved up and down along with the door. Therefore, there have been required mechanical components, such as a timing belt and a pulley, for maintaining the balance of the door between the right and the left at the time of moving up and down the door. Furthermore, because the full load of the door and the handle is applied to hands of a worker, a coil spring is required to reduce a load imposed on the worker.

The present invention has been achieved in view of the above problems, and an object of the invention is to provide a work tank of an electric discharge machining device that can manually perform moving up and down, opening and closing, and locking and unlocking of a door without using any mechanical components such as a timing belt and a pulley.

Solution to Problem

To solve above described problems and achieve the object, according to an aspect of the present invention, a work tank of an electric discharge machining device that includes a box-shaped tank body having an open front surface and an openable and closable door, in which a workpiece for electric discharge machining is taken in and out of the tank body while the front surface of the tank body not being closed by the door, and a machining fluid for the electric discharge machining is stored in the tank body with the front surface of the tank body being closed by the door. The work tank includes: a pair of handle bars that are placed right and left of the tank body, each of which includes a rotation central shaft axially supported by a side surface of the tank body so as to be slidable in a front-back direction at a back end part thereof and a hanging unit provided in a protruding manner at an intermediate portion thereof, and is rotatable about the rotation central shaft serving as an axis; a handle that is installed between front end parts of the pair of handle bars; a pair of door stays that are placed at right and left of the tank body so as to be hung from the handle bar by the hanging unit and the door is installed between one of the paired door stays and the other one of the door stays; a guide rail that moves up and down the door stay hung from the handle bar and the door in a predetermined range according to rotation of the handle bar and that can move the door stay and the door having reached a highest point backward with respect to a position at a time of an up-down movement; a load receiving unit that supports a load of the door stay and the door that are guided by the guide rail having been moved backward with respect to the position at the time of the up-down movement; and a stopper that restricts downward rotation and a frontward movement of the handle bar at a predetermined rotation position when the handle bar is rotated downward in a state where the load of the door stay and the door is supported by the load receiving unit. The door is guided by the guide rail to reach the highest point and closes the front surface of the tank body when moved backward with respect to the position at the time of the up-down movement.

Advantageous Effects of Invention

According to the present invention moving up and down, opening and closing, and locking and unlocking of the door can be manually performed without using any load supporting components such as a spring and a damper; and without using mechanical components for maintaining the balance of a door between the right and the left at the time of moving up and down the door, such as a timing belt and a pulley.

DESCRIPTION OF EMBODIMENTS

Exemplary embodiments of a work tank of an electric discharge machining device according to the present invention will be explained below in detail with reference to the accompanying drawings. The present invention is not limited to the embodiments.

First Embodiment

Figure 1:
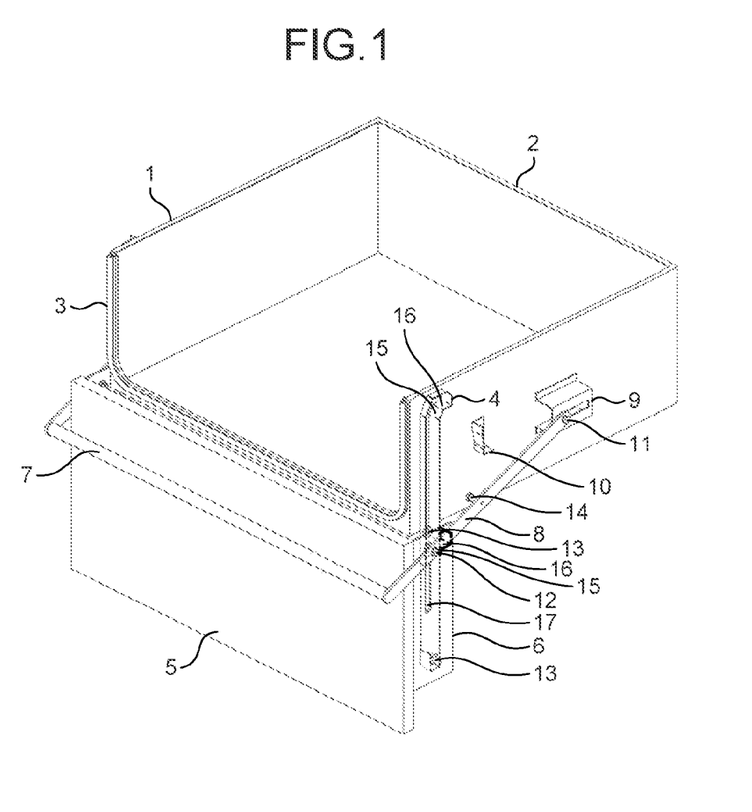
FIG. 1 depicts a configuration of a work tank of an electric discharge machining device according to a first embodiment of the present invention.

FIG. 1 depicts a configuration of a work tank of an electric discharge machining device according to a first embodiment of the present invention. FIG. 1 depicts a work tank 1 in a state where a door 5 is open, as viewed obliquely from the front. The work tank 1 includes a work tank body 2, a packing 3, a door guide rail 4, the door 5, a door stay 6, a handle 7, a handle bar 8, a handle-bar guide rail 9, a door lock stopper 10, a handle-bar-rotation central shaft 11, and a door hanging unit 12. The front surface of the work tank body 2 that has a machining fluid stored therein and accommodates a workpiece immersed in the machining fluid is open, through which the workpiece can be taken in and out. The handle 7 is integrally fixed in a vicinity of a front end of the handle bar 8 and the handle bar 8 is rotatable about the handle-bar-rotation central shaft 11 that is provided in a vicinity of a back end of the handle bar 8 and serves as an axis. The handle-bar-rotation central shaft 11 can be moved only back and forth along the handle-bar guide rail 9 fixed to the work tank body 2. The door stay 6 is fixed to the right and the left of the door 5 and hung by the door hanging unit 12 of the handle bar 8. The door hanging unit 12 is formed in a roll that is axially supported so as to protrude in a rotation axis direction (a substantially horizontal direction) of the handle-bar-rotation central shaft 11. Therefore, by operating the handle 7 up and down, the door 5 can be moved up and down.

Figure 2:
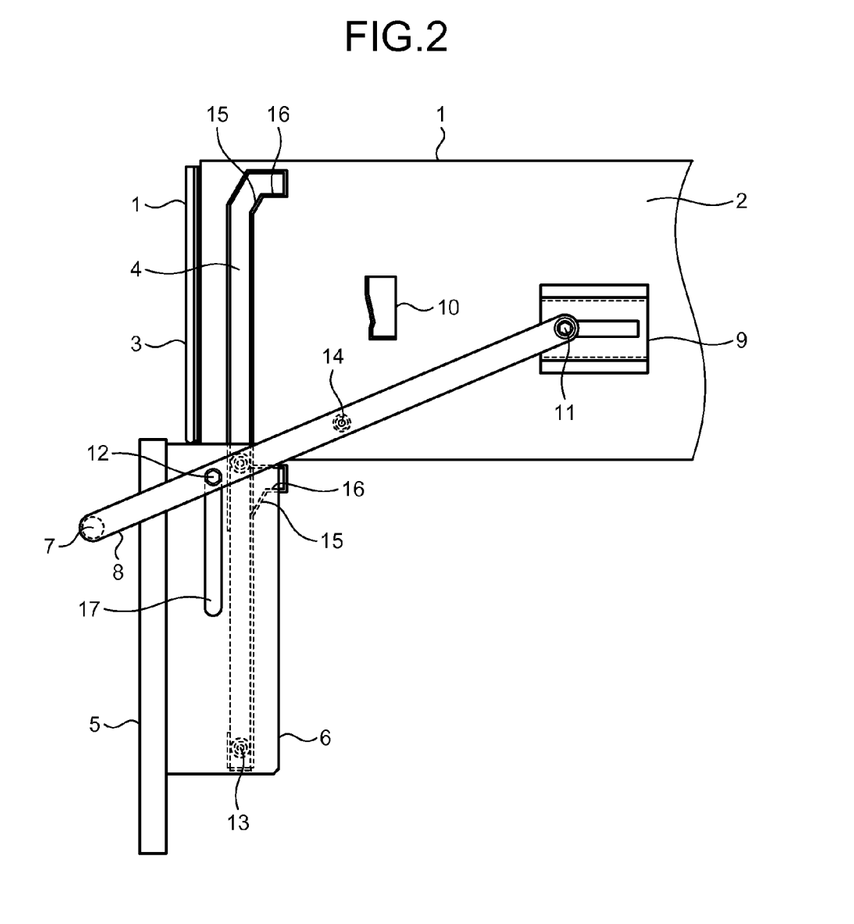
FIG. 2 is a side view of the work tank in a state where a door is open.

FIG. 2 is a side view of the work tank 1 in the state where the door 5 is open. By moving the handle 7 up and down as explained above, the door 5 that is fixed to the door stay 6 hung from the handle bar 8 is moved up and down along with the door stay 6. A door guide bearing 13 serving as a first bearing is placed in the door stay 6 and moved along the door guide rail 4 fixed to the work tank body 2. The door guide rail 4 guides the door guide bearing 13 only in a direction of up and down and to a door lock position and restricts a frontward and backward movement of the door guide bearing 13 at positions other than at a highest point of the door guide rail 4. The handle-bar-rotation central shaft 11 is placed in the work tank body 2, and the frontward and backward movement of the handle-bar-rotation central shaft 11 is restricted by the handle-bar guide rail 9; the movement of the door 5 in the front-back direction is restricted by the door guide rail 4 and the door guide bearing 13; and the handle 7 is integrally fixed to the handle bar 8 so as to realize a structure having no twist. Consequently, the door 5 can be smoothly moved up and down without using mechanical components for maintaining the balance of the door 5 between the right and the left, such as a timing belt and a pulley.

Figure 3:
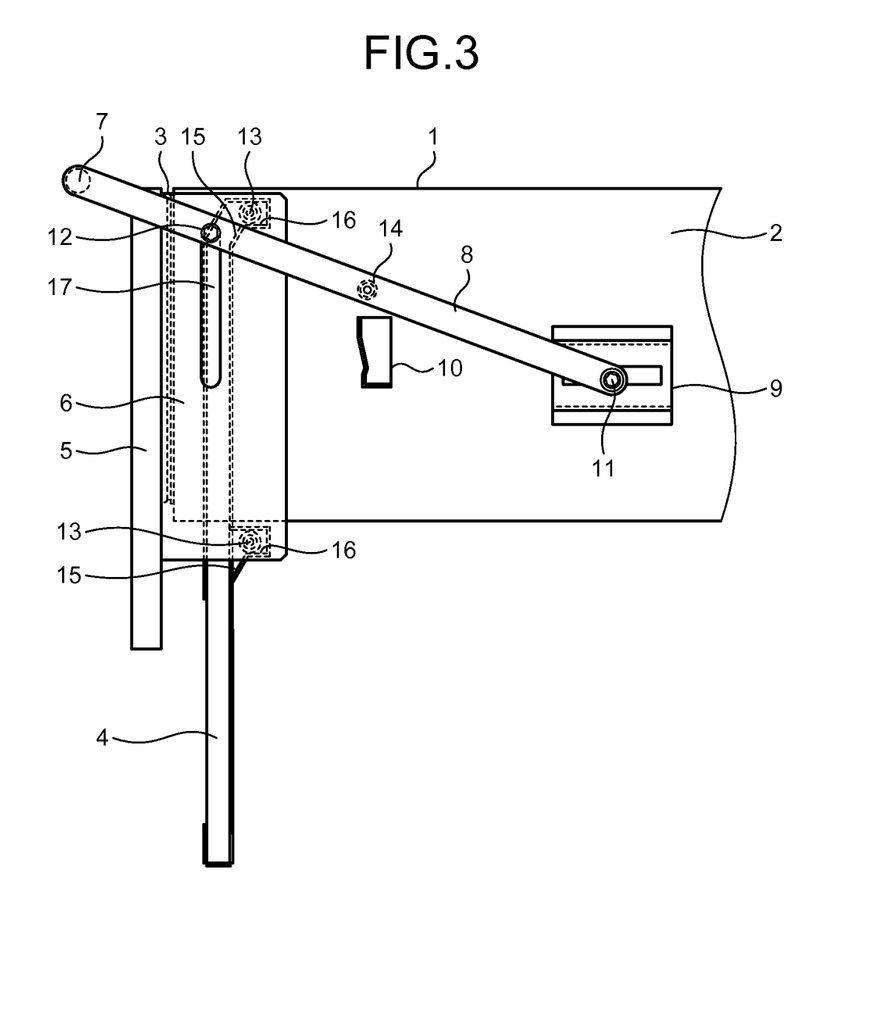
FIG. 3 is a side view of the work tank in a state where a handle is moved up to a highest point and the door is not locked yet.
Figure 4:
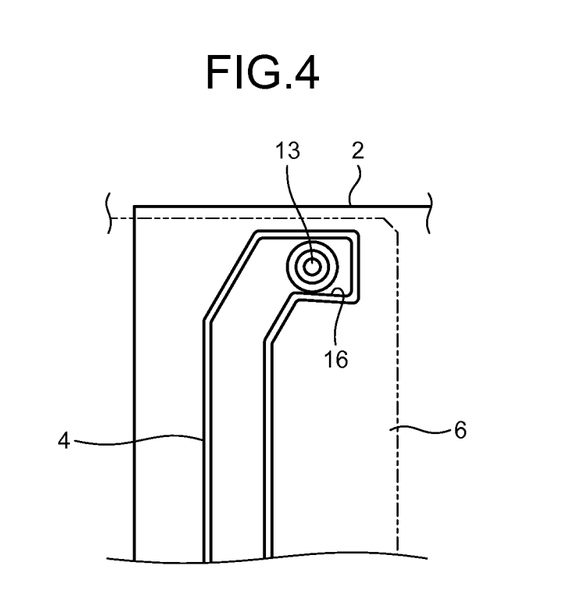
FIG. 4 is an example of a guide-rail load receiving unit having a backward descending inclination.

FIG. 3 is a side view of the work tank 1 in a state where the handle 7 is moved up to the highest point and the door 5 is not locked yet. When the handle 7 is moved up, the door hanging unit 12 abuts against an upper end part of a slit unit 17 formed in a vertically-elongated hole, so that the door stay 6 and the door 5 that are hung are moved up. When the handle 7 reaches the vicinity of the highest point where the handle 7 can be moved up, the door guide bearing 13 placed in the door stay 6 is guided along a guide-rail inclined portion 15 of the door guide rail 4 toward an inner side of the work tank (rightward in FIG. 3) to reach a guide-rail load receiving unit 16. When the door guide bearing 13 reaches the guide-rail load receiving unit 16, a load of the door 5 is supported by the guide-rail load receiving unit 16 and the door 5 is prevented from falling. To prevent the door 5 from falling more reliably, it is preferable that a backward descending inclination is provided at the guide-rail load receiving unit 16. FIG. 4 is an example of the guide-rail load receiving unit 16 having a backward descending inclination. The guide-rail load receiving unit 16 and the door guide rail 4 may be separate members.

Figure 5:
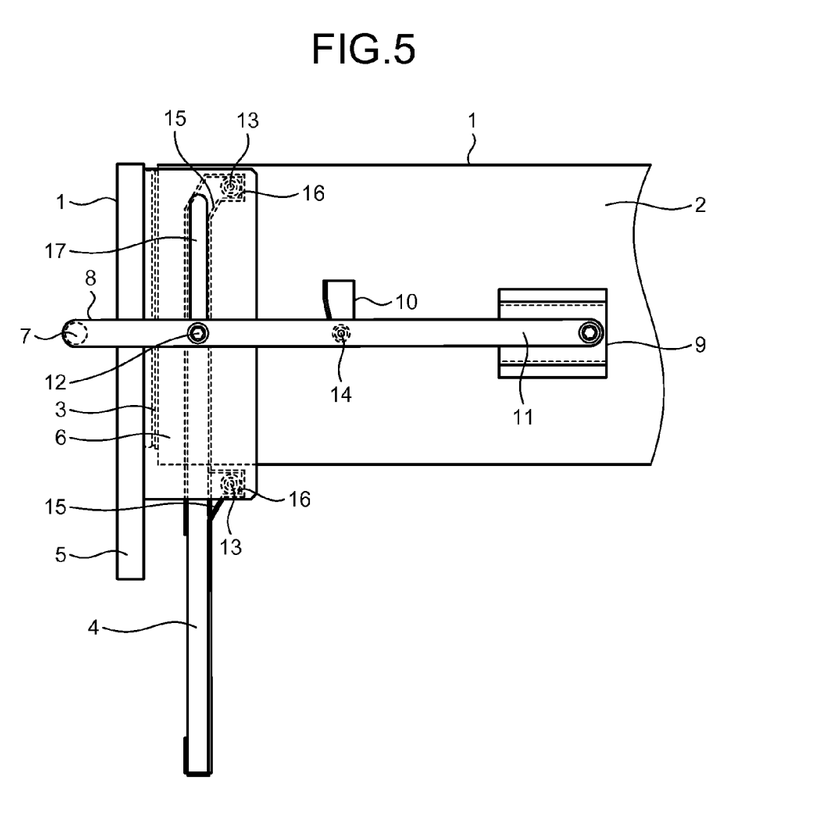
FIG. 5 is a side view of the work tank in a state where the door is locked.

FIG. 5 is a side view of the work tank 1 in a state where the door 5 is locked. By forming an outer circumferential part of the door hanging unit 12 as a rotatable roller structure, it is easy for the door hanging unit 12 to freely slide up and down in the slit unit 17 of the door stay 6. When the door guide bearing 13 does not reach the guide-rail load receiving unit 16, the door 5 is always hung by the door hanging unit 12 under its own weight. In a state where the door guide bearing 13 reaches the guide-rail load receiving unit 16, the door 5 is not moved because it is supported by the guide-rail load receiving unit 16 and only the handle 7 and the handle bar 8 can be moved downward. That is, the door hanging unit 12 is moved away from the upper end part of the slit unit 17, so that the door stay 6 is in a non-hung state and only the handle bar 8 is rotated. By moving down the handle 7 and the handle bar 8 while the door 5 is supported by the guide-rail load receiving unit 16, a door lock bearing 14 that is provided in right and left handle bars 8 and serves as a second bearing is moved behind the door lock stopper 10. By further moving down the handle 7, the door lock bearing 14 is drawn backward along an inclination of the door lock stopper 10. When the handle bar 8 becomes horizontal, the door lock bearing 14 abuts against the door lock stopper 10 and stops. In this way, locking of the door 5 is completed. Because a repulsion force of the packing 3 biases the door 5 in a direction of pushing the door guide bearing 13 out of the guide-rail load receiving unit 16, the handle 7 may be moved down while applying a force of pushing the handle 7 backward before locking of the door 5 is completed.

Figure 6:
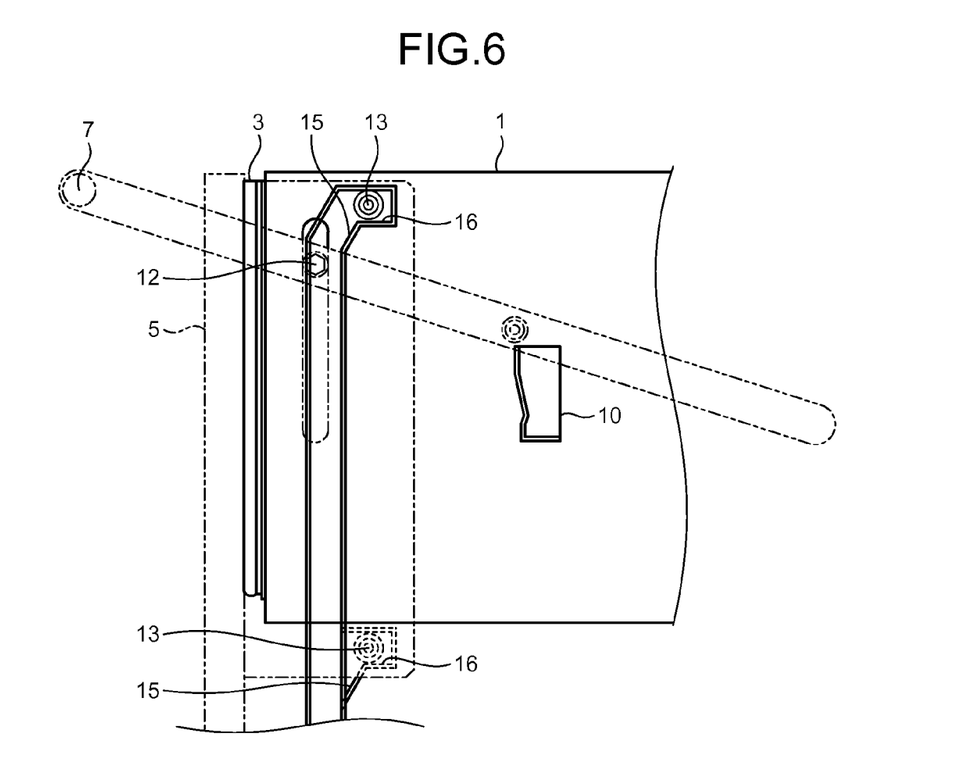
FIG. 6 is a side view of the work tank in the process of unlocking the door.

FIG. 6 is a side view of the work tank 1 in the process of unlocking the door 5. When the handle 7 is moved up in a state where the door 5 is locked, the door 5 is pushed frontward by the repulsion force of the packing 3. At this time, there is a possibility that, because of a positional relationship between the center of gravity of the door 5 and the door hanging unit 12, the door 5 is inclined frontward and only the door guide bearing 13 on the upper side is pushed out, so that the door 5 may not be smoothly unlocked and moved down. Therefore, in the first embodiment, with respect to the upper and lower guide-rail load receiving units 16, the size of the front-back direction of the lower one of the guide-rail load receiving units 16 is reduced, and when the door 5 is slightly pushed out, the door guide bearing 13 is moved to the guide-rail inclined portion 15 and the door 5 can be smoothly moved down.

Figure 7:
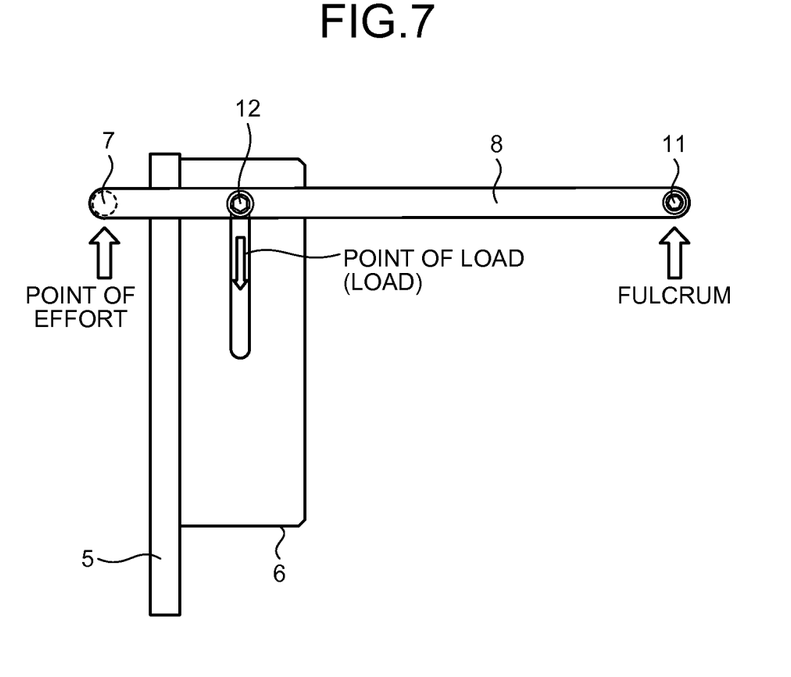
FIG. 7 depicts a concept of a force action at the time of opening and closing the door of the work tank of the electric discharge machining device according to the first embodiment.

FIG. 7 depicts a concept of a force action at the time of opening and closing the door of the work tank of the electric discharge machining device according to the present embodiment. A door opening/closing mechanism can be regarded as a lever in which the handle-bar-rotation central shaft 11 functions as a fulcrum, the handle 7 supported by a worker as a point of effort, and the door hanging unit 12 receiving the load of the door 5 as a point of load. That is, by using this structure, the principle of leverage can be used for supporting the load of the door 5 when opening and closing the door and thus the worker can support the load of the door 5 with a small force. Because this configuration eliminates the need of a power source such as a motor to open and close the door, energy consumption at the time of opening and closing the door can be suppressed. The length of the handle bar 8, the position of the door hanging unit 12 that is the point of load, and the like can be appropriately decided according to the mass of the door 5, the dimensional restrictions of an electric discharge machining device, and the like.

As explained above, according to the first embodiment, the door 5 can be moved up and down, opened and closed, and locked and unlocked by operating the handle 7, and the load on a worker can be reduced without using any load supporting components such as a spring and a damper. Furthermore, because the handle 7 is installed between the right and left handle bars 8, by operating the handle 7 by one hand, the door 5 installed between the door stays 6 can be moved up and down, opened and closed, and locked and unlocked. Further, because the device has a configuration of not using a damper having low durability as a component, the lifetime of the work tank can be extended. Because a simple structure using a handle bar and a rail is realized, the device can be disassembled into components and thus recycling can be easily carried out.

Figure 8A:
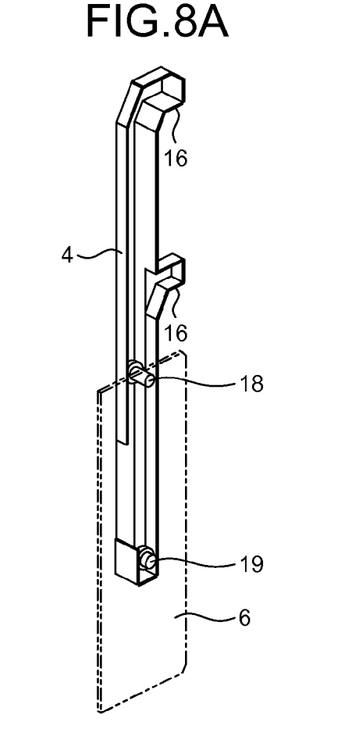
FIG. 8A depicts a configuration of main parts of a work tank of an electric discharge machining device according to a second embodiment of the present invention when a door is open.
Figure 8B:
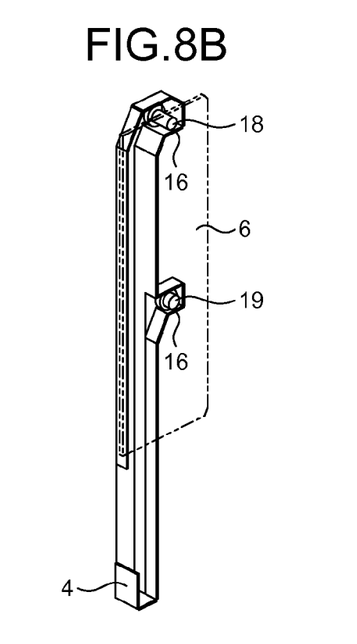
FIG. 8B depicts a configuration of main parts of the work tank of the electric discharge machining device according to the second embodiment of the present invention when the door is locked.

FIGS. 8A and 8B depict a configuration of main parts of a work tank of an electric discharge machining device according to a second embodiment of the present invention. FIGS. 8A and 8B depict a shape of the door guide rail 4 and positions of the door stay 6 and door guide bearings 18 and 19 according to the second embodiment, as viewed obliquely from the front. FIG. 8A depicts positions of the door stay 6 and the door guide bearings 18 and 19 when a door is open. FIG. 8B depicts positions of the door stay 6 and the door guide bearings 18 and 19 when the door is locked. The door guide bearings 18 and 19 are placed vertically in a line on a side surface of the door stay 6 and moved along the door guide rail 4 fixed to the work tank body 2. By causing the height (the distance) of the door guide bearing 18 from the door stay 6 and the distance of the door guide bearing 19 from the door stay 6 to be different from each other, the door guide bearing 18 and the door guide bearing 19 can be caused to follow different trajectories when they are moved up and down. Therefore, it is possible to prevent the door guide bearing 18 from entering the lower guide-rail load receiving unit 16.

Figure 9:
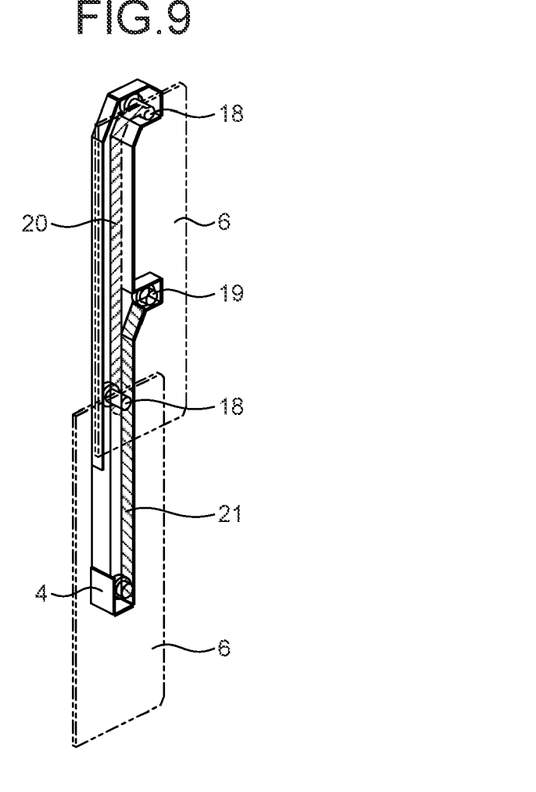
FIG. 9 depicts passing ranges of door guide bearings when they are moved up and down.

FIG. 9 depicts passing ranges of the door guide bearings 18 and 19 when they are moved up and down. The door guide bearing 18 passes through a passing range 20 and the door guide bearing 19 passes through a passing range 21. That is, according to the second embodiment, the passing range 20 of the door guide bearing 18 is horizontally separated from the passing range 21 of the door guide bearing 19. The door guide rail 4 is formed of a sheet metal. Because the passing range of the upper bearing is different from that of the lower bearing, the door guide rail 4 can serve its own function by forming the sheet metal in the minimum shape that can cover the passing ranges. That is, as compared to the first embodiment in which the passing range of the upper bearing is vertically separated from the passing range of the lower bearing, the total length of the door guide rail 4 can be shortened. By guiding the bearings in different routes by a short rail, the cost of materials for the door guide rail 4 can be reduced and the cost of manufacturing the work tank 1 can be reduced.

Other features of the second embodiment are identical to those of the first embodiment, and thus redundant explanations thereof will be omitted.

Third Embodiment

Figure 10:
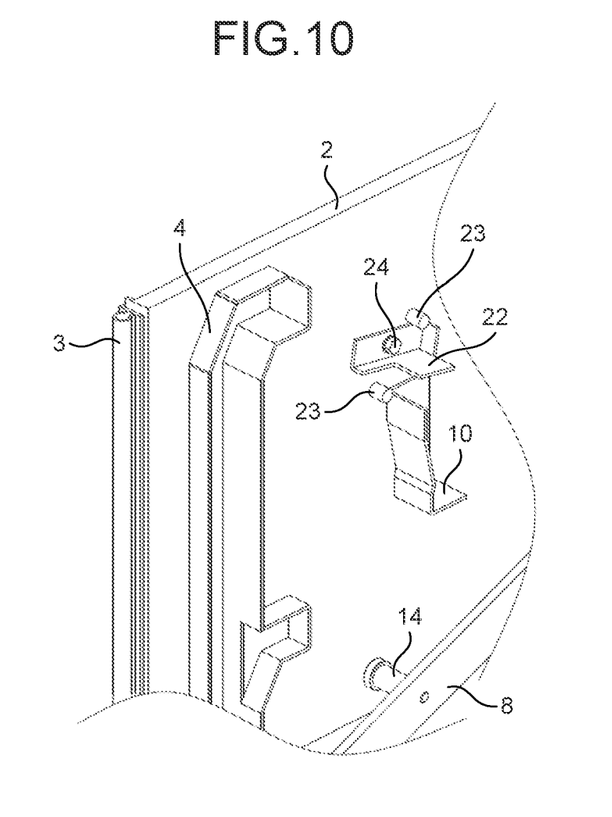
FIG. 10 depicts a configuration of a work tank of an electric discharge machining device according to a third embodiment of the present invention.

FIG. 10 depicts a configuration of a work tank of an electric discharge machining device according to a third embodiment of the present invention. FIG. 10 depicts a side surface of the work tank body 2 in a state where the door 5 is open, as viewed obliquely from the front. The third embodiment is different from the second embodiment in that a latch 22 for performing operations of the handle bar 8 at the time of locking and unlocking the door 5 in different trajectories and a latch stopper 23 that restricts a movable range of the latch 22 are provided. The latch 22 is placed so as to be rotatable about a latch-rotation central shaft 24 serving as an axis.

Figure 11A:
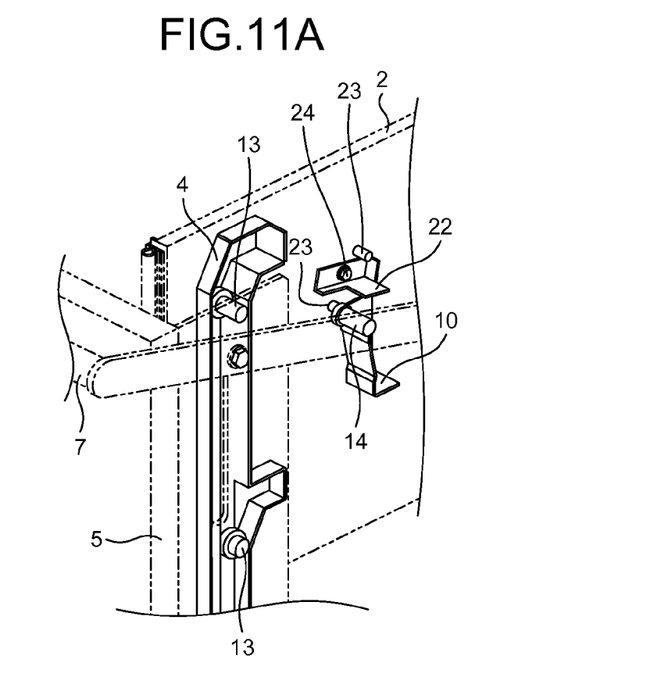
FIG. 11A depicts a handle in the process of being moved up.

FIGS. 11A, 11B, 11C, 11D, and 11E depict a movement of the handle 7 and the latch 22 at the time of locking the door 5. FIG. 11A depicts the handle 7 in the process of being moved up. The door guide bearing 13 is moved along the door guide rail 4 and thus the door 5 is moved up.

Figure 11B:
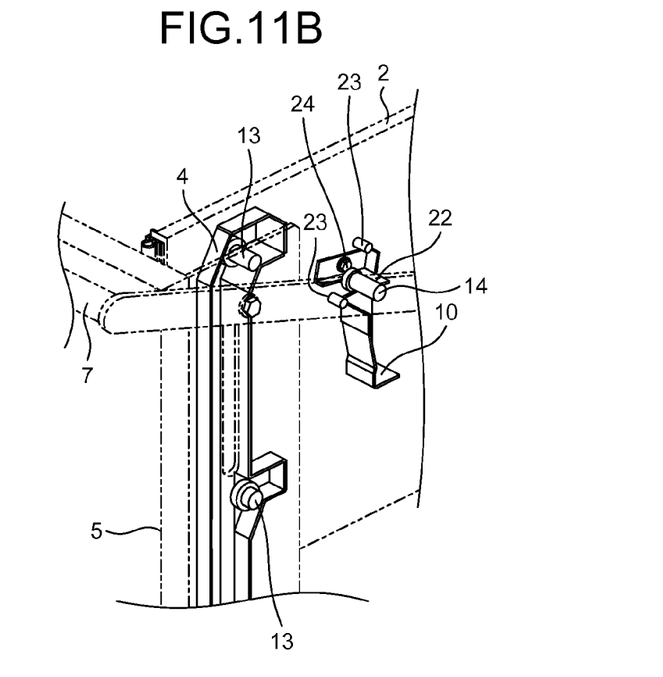
FIG. 11B depicts a state where the handle is positioned in a vicinity of a highest point.

FIG. 11B depicts a state where the handle 7 is positioned in a vicinity of a highest point. When the handle 7 is further moved up, the door guide bearing 13 is guided by the door guide rail 4, the door 5 is moved toward a side of the work tank body 2, and the handle 7 is also drawn toward the side of the work tank body 2 according to the movement of the door 5. At this time, the door lock bearing 14 passes on an upper side of the latch 22.

Figure 11C:
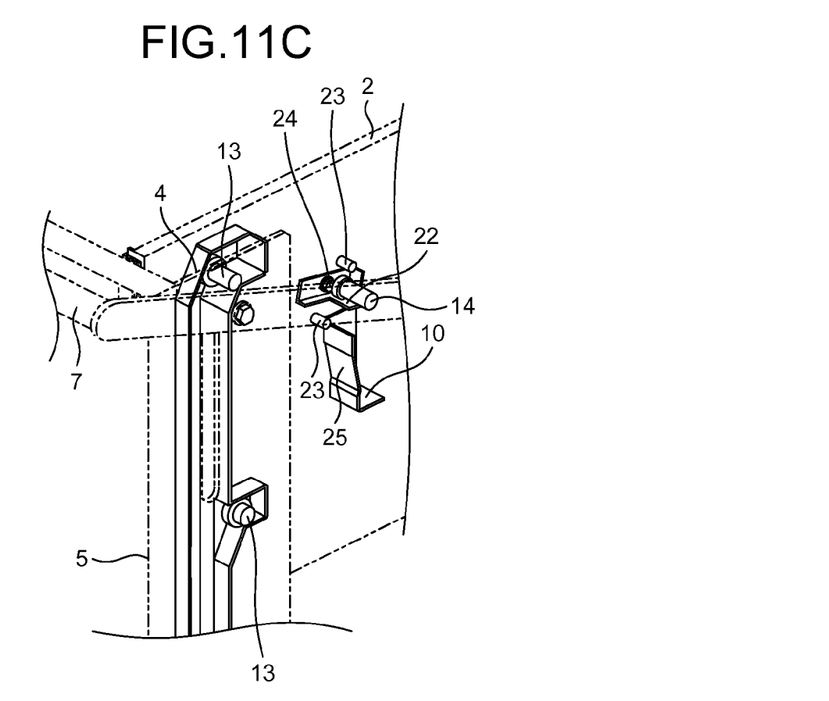
FIG. 11C depicts a state where the handle is positioned at a highest point and completely drawn backward.

FIG. 11C depicts a state where the handle 7 is positioned at the highest point and completely drawn backward. At this time, the door lock bearing 14 passes on the upper side of the latch 22 and is positioned at the back of a partition unit 25 of the door lock stopper 10, that is, on a side of the partition unit 25 opposite to the door 5.

Figure 11D:
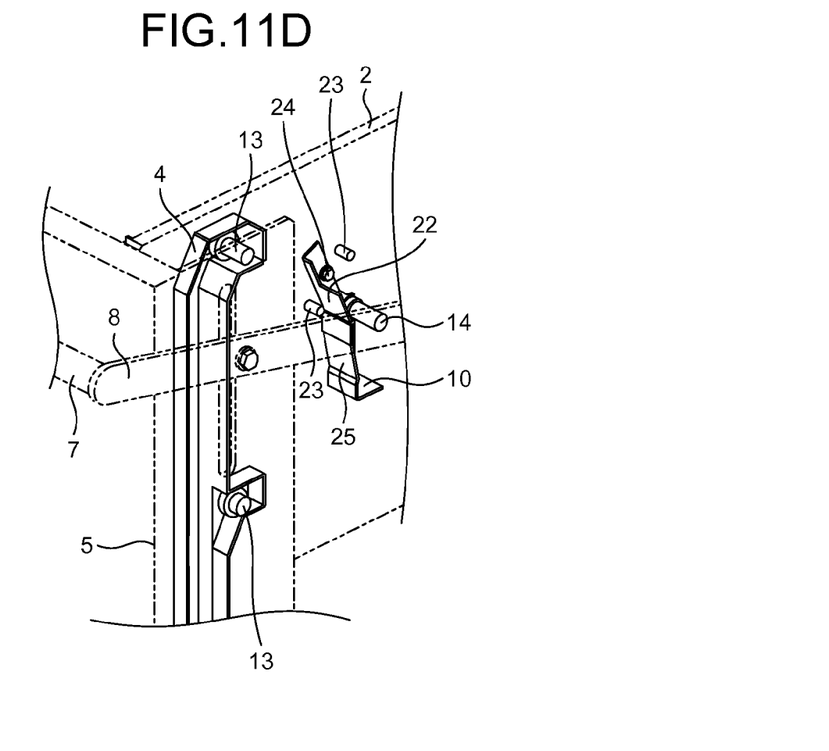
FIG. 11D depicts a state in the process of locking the door at a step of moving down the handle to lock the door.

FIG. 11D depicts a state in the process of locking the door 5 at a step of moving down the handle 7 to lock the door 5. In this case, the door lock bearing 14 is moved downward while pressing the latch 22. Meanwhile, the latch 22 rotates about the latch-rotation central shaft 24 and thus the latch 22 does not disturb the movement of the door lock bearing 14, so that the door lock bearing 14 is continuously moved downward. At this time, because the angle of the latch 22 is restricted so that the rotation of the latch 22 is stopped by the lower latch stopper 23 at a position where the latch 22 is smoothly connected to the door-lock stopper partition unit 25, the movement of the door lock bearing 14 is not disturbed. Because an impact when the door lock bearing 14 abuts against the latch 22 and an impact when the door lock bearing 14 is moved from the latch 22 to the partition unit 25 of the door lock stopper 10 are transmitted via the handle bar 8 and the handle 7 to hands of a worker, the worker can accurately know a timing that the door 5 is locked.

Figure 11E:
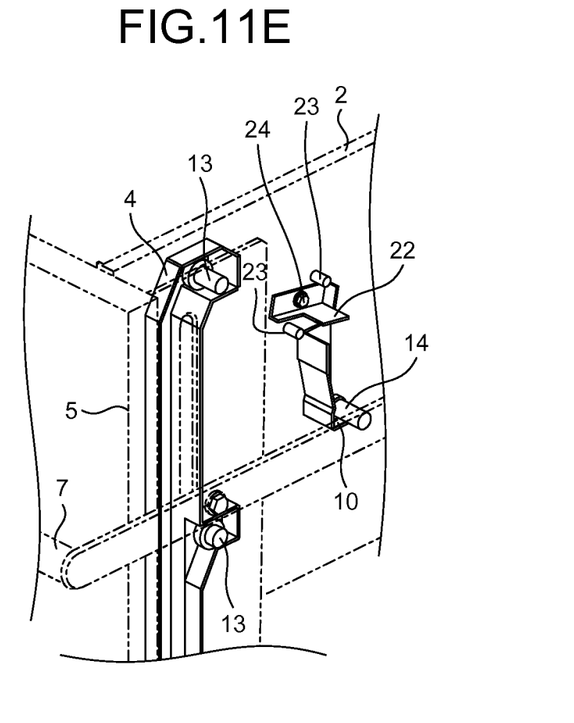
FIG. 11E depicts a state where the handle is completely moved down at the time of locking the door.

FIG. 11E depicts a state where the handle 7 is completely moved down at the time of locking the door 5, that is, locking of the door 5 is completed. At this time, a force of rotating the latch 22 in a direction of returning to the original position acts on the latch 22 because of a positional relationship between the center of gravity of the latch 22 and the latch-rotation central shaft 24; and the rotation angle of the latch 22 is restricted by the upper latch stopper 23, so that the latch 22 automatically returns to the original position.

Figure 12A:
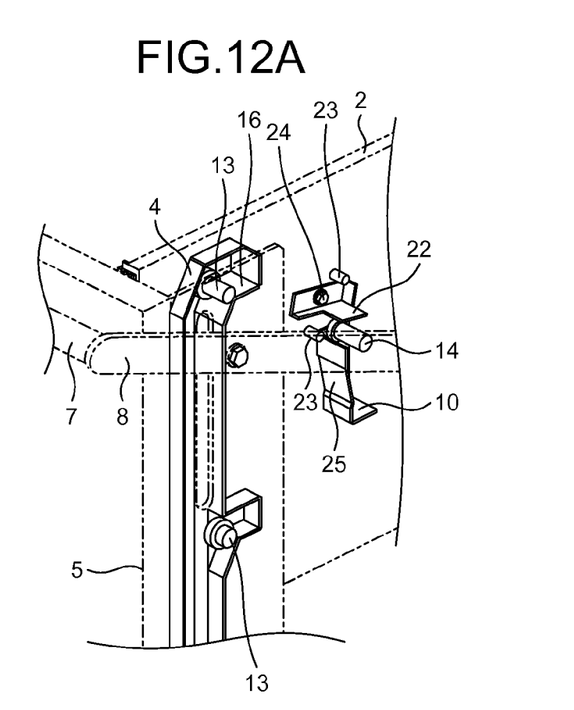
FIG. 12A depicts a state in the process of moving up the handle from a locked state.
Figure 12B:
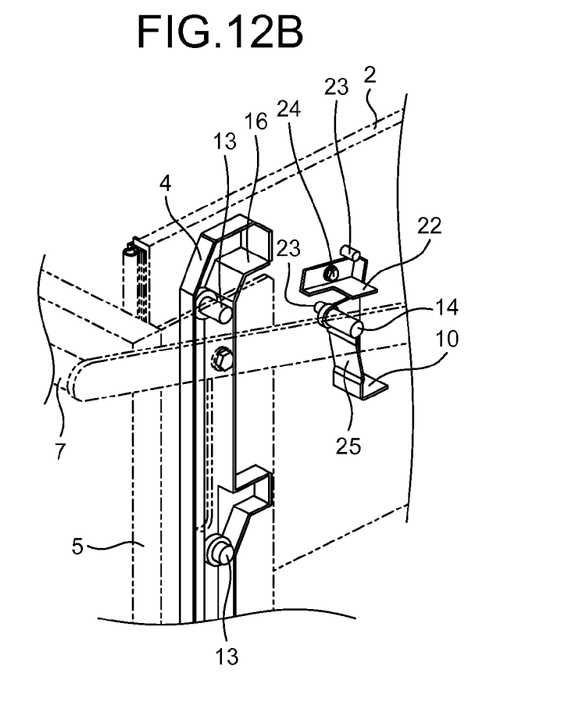
FIG. 12B depicts a state where the door is unlocked.

FIGS. 12A and 12B depict a movement of the handle 7 and the latch 22 at the time of unlocking the door 5. FIG. 12A depicts a state in the process of moving up the handle 7 from a locked state, that is, the state shown in FIG. 11E. When the handle 7 is moved up, the door lock bearing 14 is moved up to the position of the latch 22 to abut against the lower side of the latch 22. Because an impact when the door lock bearing 14 abuts against the latch 22 is transmitted to the hands of the worker via the handle bar 8 and the handle 7, the worker can accurately know a timing that the door 5 is unlocked. Because the rotation of the latch 22 is restricted by the latch stopper 23, the latch 22 does not rotate in a direction opposite to a rotation direction at the time of locking the door 5 even when the door lock bearing 14 abuts against the lower side of the latch 22. Further, the latch 22 is placed in an inclined manner to be higher on the side of the door 5 and is placed so that a space through which the door lock bearing 14 can pass is formed between the lower side of the latch 22 and the partition unit 25 of the door lock stopper 10. That is, the door lock bearing 14 is moved up along with the handle 7 being moved up, guided by an inclination of the latch 22, passed between the lower side of the latch 22 and the partition unit 25 of the door lock stopper 10, and guided to the side of the door 5. While the door lock bearing 14 is passing through the partition unit 25 of the door lock stopper 10, the upper door guide bearing 13 is still placed on the guide-rail load receiving unit 16 and thus the door 5 is not moved down.

FIG. 12B depicts a state where the handle 7 is continuously moved up from the state shown in FIG. 12A and the door 5 is unlocked. Only after the door 5 is drawn frontward and the door lock bearing 14 completely passes through the partition unit 25 of the door lock stopper 10, the door 5 starts to be moved down and the handle 7 can be also moved down. By continuously moving down the handle 7, the door 5 is also moved down, so that a step of unlocking and opening a door is completed.

As explained above, according to the present embodiment, a worker can be reliably notified of a timing that the door 5 is locked and unlocked via the handle bar 8 and the handle 7.

INDUSTRIAL APPLICABILITY

As described above, the work tank of the wire electric discharge machining device according to the present invention is useful in that the door can be manually opened and closed and locked and unlocked by a handle operation and is particularly suitable for a work tank with a heavy weight.

REFERENCE SIGNS LIST 1 work tank
2 work tank body
3 packing
4 door guide rail
5 door
6 door stay
7 handle
8 handle bar
9 handle-bar guide rail
10 door lock stopper
11 handle-bar-rotation central shaft
12 door hanging unit
13, 18, 19 door guide bearing
14 door lock bearing
15 guide-rail inclined portion
16 guide-rail load receiving unit
17 slit unit
20, 21 passing range
22 latch
23 latch stopper
24 latch-rotation central shaft
25 partition unit

The invention claimed is:

1. A work tank of an electric discharge machining device comprising:
a tank body having an open front surface and an openable and closable door, in which a workpiece for electric discharge machining is taken in and out of the tank body while the front surface of the tank body not being closed by the door, and a machining fluid for the electric discharge machining is stored in the tank body with the front surface of the tank body being closed by the door;
a pair of handle bars that are placed right and left of the tank body, each of which includes a rotation central shaft axially supported by a side surface of the tank body so as to be slidable in a front-back direction at a back end part thereof and a hanging unit provided in a protruding manner at an intermediate portion thereof, and is rotatable about the rotation central shaft serving as an axis;
a handle that is installed between front end parts of the pair of handle bars;
a pair of door stays that are placed at right and left of the tank body so as to be hung from the handle bars by the hanging unit and the door is installed between one of the paired door stays and the other one of the door stays;
a guide rail that moves up and down the door stay hung from each handle bar and the door in a predetermined range according to rotation of the handle bars and that can move the door stay and the door having reached a highest point backward with respect to a position at a time of an up-down movement;
a load receiving unit that supports a load of the door stay and the door that are guided by the guide rail having been moved backward with respect to the position at the time of the up-down movement; and
a stopper that restricts downward rotation and a frontward movement of each handle bar at a predetermined rotation position when the handle bars are rotated downward in a state where the load of the door stay and the door is supported by the load receiving unit, wherein
the door is guided by the guide rail to reach the highest point and closes the front surface of the tank body when moved backward with respect to the position at the time of the up-down movement.

2. The work tank of an electric discharge machining device according to claim 1, wherein the load receiving unit is configured as a part of the guide rail.

3. The work tank of an electric discharge machining device according to claim 1, wherein each of the door stays includes a vertically elongated hole into which the hanging unit is inserted, and the hanging unit abuts against an upper end of the elongated hole, so that the door stays are hung from the handle bars.

4. The work tank of an electric discharge machining device according to claim 1, wherein the door stay includes a plurality of first bearings that are guided by the guide rail when the door stays are moved according to rotation of the handle bars, and the first bearings are placed in the door stay so as to be vertically in a line and have different distances from a plane where the first bearings are placed.

5. The work tank of an electric discharge machining device according to claim 1, further comprising:

a bearing that is provided in a protruding manner at a back end side of each handle bar with respect to the hanging unit; and a component that guides the second bearing by routes that are different between a case of rotating the handle bars upward and a case of rotating the handle bars upward when the door stays are not hung from the handle bars.

6. The work tank of an electric discharge machining device according to claim 5, wherein the stoppers abut against the bearing to restrict downward rotation and a frontward movement of the handle bars.

* * * * *